US010723300B2

(12) United States Patent
Faruque et al.

(10) Patent No.: US 10,723,300 B2
(45) Date of Patent: Jul. 28, 2020

(54) BOW TIE DRIVER AIRBAG SYSTEM (71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 15/900,900

(22) Filed: Feb. 21, 2018

(65) Prior Publication Data

US 2019/0256032 A1 Aug. 22, 2019

(51) Int. Cl.
*B60R 21/203* (2006.01)
*B60R 21/205* (2011.01)
*B60R 21/2165* (2011.01)
*B60R 21/231* (2011.01)
*B60R 21/013* (2006.01)
*B60R 21/2338* (2011.01)
B60R 21/01 (2006.01)
B60R 21/00 (2006.01)

(52) U.S. Cl.
CPC ........ *B60R 21/2035* (2013.01); *B60R 21/013* (2013.01); *B60R 21/203* (2013.01); *B60R 21/205* (2013.01); *B60R 21/2165* (2013.01); *B60R 21/2338* (2013.01); *B60R 21/23138* (2013.01); *B60R 2021/0004* (2013.01); *B60R 2021/0009* (2013.01); *B60R 2021/01211* (2013.01); *B60R 2021/23107* (2013.01); *B60R 2021/23386* (2013.01)

(58) Field of Classification Search
CPC .............. B60R 21/2035; B60R 21/203; B60R 21/2338; B60R 21/23138; B60R 21/205; B60R 2021/23386; B60R 2021/0009; B60R 2021/0004; B60R 2021/23107
See application file for complete search history.

(56) References Cited

U.S. PATENT DOCUMENTS 3,476,402 A * 11/1969 Wilfert .................. B60R 21/233 280/729
5,605,350 A * 2/1997 Bates .................... B60R 21/203 280/731

(Continued)

FOREIGN PATENT DOCUMENTS

CN 1521060 A 8/2004
DE 19923483 A1 11/2000

(Continued)

*Primary Examiner* — Frank B Vanaman
(74) *Attorney, Agent, or Firm* — Frank A. MacKenzie; Bejin Bieneman PLC (57) ABSTRACT

An airbag system includes a center airbag, a first side-wing airbag, a second side-wing airbag, and a tether. The center airbag is disposed in a steering wheel of a vehicle. The first side-wing airbag is disposed on a first side of a support housing disposed between the steering wheel and an instrument panel of the vehicle. The second side-wing airbag is disposed on a second side of the support housing. The tether connects the side-wing airbags and is disposed above the support housing.

18 Claims, 10 Drawing Sheets

(56) References Cited

U.S. PATENT DOCUMENTS

| | | | | |
|---|---|---|---|---|
| 5,900,807 | A * | 5/1999 | Moriyama | B60R 21/0132 |
| | | | | 180/282 |
| 2004/0026909 | A1* | 2/2004 | Rensinghoff | B60R 21/231 |
| | | | | 280/732 |
| 2004/0160043 | A1* | 8/2004 | Litiens | B29C 43/021 |
| | | | | 280/732 |
| 2006/0197324 | A1* | 9/2006 | Klinkenberger | B60R 21/203 |
| | | | | 280/731 |
| 2015/0307055 | A1* | 10/2015 | Cheng | B60R 21/203 |
| | | | | 280/728.3 |
| 2016/0244016 | A1 | 8/2016 | Takeshita et al. | |
| 2017/0136981 | A1 | 5/2017 | Fukawatase et al. | |
| 2017/0282827 | A1 | 10/2017 | Choi | |
| 2018/0208143 | A1* | 7/2018 | Fischer | B60R 21/205 |
| 2018/0297550 | A1* | 10/2018 | Kitagawa | B60R 21/237 |

FOREIGN PATENT DOCUMENTS

| | | |
|---|---|---|
| EP | 1650087 B1 | 11/2008 |
| JP | 2015093603 A | 5/2015 |

* cited by examiner

BOW TIE DRIVER AIRBAG SYSTEM

BACKGROUND

During a vehicle frontal impact other than a pure frontal impact, e.g., an oblique impact, an offset impact, a driver within the vehicle may, due to inertial effects, move at an angle towards a door hinge pillar or an instrument panel. In such an event, the driver's head may move away from a center of an airbag disposed in a steering wheel. Such movement may result an in incomplete restraint of the driver's head by the airbag. An incomplete restraint of the head may lead to an increase in rotational motion of the head and a sliding of the driver's head off of the airbag surface. It is desired to provide an airbag that reduces a potential for the driver's head to rotate and reduces a potential for the driver's head to slide off the airbag.

DETAILED DESCRIPTION

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

An airbag system includes a center airbag, a first side-wing airbag, a second side-wing airbag, and a tether. The center airbag is disposed in a steering wheel of a vehicle. The first side-wing airbag is disposed on a first side of a support housing. The support housing is disposed between the steering wheel and an instrument panel of the vehicle. The second side-wing airbag is disposed on a second side of the support housing. The tether connects the side-wing airbags and is disposed above the support housing.

The tether may be a fabric panel extending in a deployed position from the support housing to an outer radius of the side-wing airbags.

The fabric panel may be non-inflatable.

The tether may extend beyond the center airbag in the deployed position.

The airbag system may include a first inflator for the center airbag and a second inflator for the side-wing airbags.

The airbag system may include an airbag cover enclosing the side-wing airbags and the tether in the undeployed position.

A bow tie airbag system includes a center airbag assembly and a bow airbag assembly. The center airbag assembly includes a center airbag disposed in a steering wheel of a vehicle. The bow airbag assembly includes a first side-wing airbag, a second side-wing airbag, a tether, and an airbag cover. The first side-wing airbag is disposed on a first side of a support housing. The support housing is disposed between the steering wheel and an instrument panel of the vehicle. The second side-wing airbag is disposed on a second side of the support housing. The tether connects the side-wing airbags and is disposed above the support housing. The airbag cover encloses the side-wing airbags and the tether in the undeployed position.

The airbag system may further include a computing device. The computing device may be programmed to determine that a frontal impact has been sensed. When it is determined that a frontal impact has been sensed, the computing device may cause deployment of the center airbag. The computing device mays also be programmed to determine that an oblique impact has been sensed. When it is determined that an oblique impact has been sensed, the computing device may cause deployment of the center airbag and the side-wing airbags.

When the airbags are in the deployed positions, the side-wing airbags and the center airbag may cooperatively define first and second valleys.

The side-wing airbags, when in a deployed position, may extend axially beyond the center airbag in the deployed position.

The airbag cover may be fixed to the support housing.

The airbag cover may have an inverted U-shape.

The airbag cover may be formed of plastic and include a tear seam.

An example bow tie airbag system 20 for a vehicle 22 as shown in FIGS. 1-10 includes an example center airbag assembly 24 and an example bow airbag assembly 26.

The center airbag assembly 24 may be mounted in a steering wheel 28 at a hub 29 of the steering wheel 28. The steering wheel 28 may be supported by a support mechanism, e.g., a rotation bearing (not shown) or a steering column (not shown), defining a steering wheel axis of rotation 30 and allowing the steering wheel 28 to rotate about the steering wheel axis of rotation 30 and spacing the steering wheel rearward of an instrument panel 31. A support housing 32 may be disposed over the steering wheel's 28 support mechanism to conceal the support mechanism. Rotation of the steering wheel 28 allows a vehicle operator to steer the vehicle 22 by electronically or mechanically transmitting rotation of the steering wheel 28 to a steering linkage (not shown) to effect movement of the steering linkage.

The bow airbag assembly 26 may be mounted to partially surround the support housing 32 with example mounting locations being the support housing 32 itself and the instrument panel 31. A seat 34 disposed behind the steering wheel 28 is illustrated with an occupant 36 therein. The occupant 36 may be characterized as a driver of the vehicle 22, given that the occupant 36 is positioned behind the steering wheel 28.

The bow airbag assembly 26 includes an example left side-wing airbag 38, an example right side-wing airbag 40, and an example tether, shown in the form of a fabric panel 42, disposed between and connecting the left side-wing airbag 38 and the right side-wing airbag 40. The tether 42 may be provided in forms other than the fabric panel illustrated in FIGS. 6, 7 and 8, e.g., a fabric strap connecting upper, outboard areas of the airbags 38, 40.

In an undeployed position, the side-wing airbags 38, 40 and the fabric panel 42 are folded within an example bow airbag cover 44 shown as fixed to the support housing 32 as best shown in FIGS. 2, 3, 4, 5A and 5B. The cover 44 may be formed of plastic with an inverted U-shape, having a left portion, a right portion and a top portion connecting the left and right portions. The left side-wing airbag 38 is largely disposed in the left portion, the right side-wing airbag 40 in the right portion, and the fabric panel in the top portion. A bow airbag cover tear seam 46 is formed along a length of the airbag cover 44, across each of the left portion, the top portion and the right portion. The seam 46 defines a reduced-strength area that facilitates tearing, e.g., a localized reduced cross-sectional thickness, perforations.

A bow airbag actuator 48, i.e., an inflator, of the assembly 26 may be disposed inside of the housing 32 and connected to the left side-wing airbag 38 by a left connecting tube 50 and connected to the right side-wing airbag 40 by a right connecting tube 52. The tubes 50, 52 may pass through the housing 32. The actuator 48 may be actuated by an electrical signal to deploy the associated airbags 38, 40 responsive to signals or data from vehicle sensors as discussed below.

Figure 3:
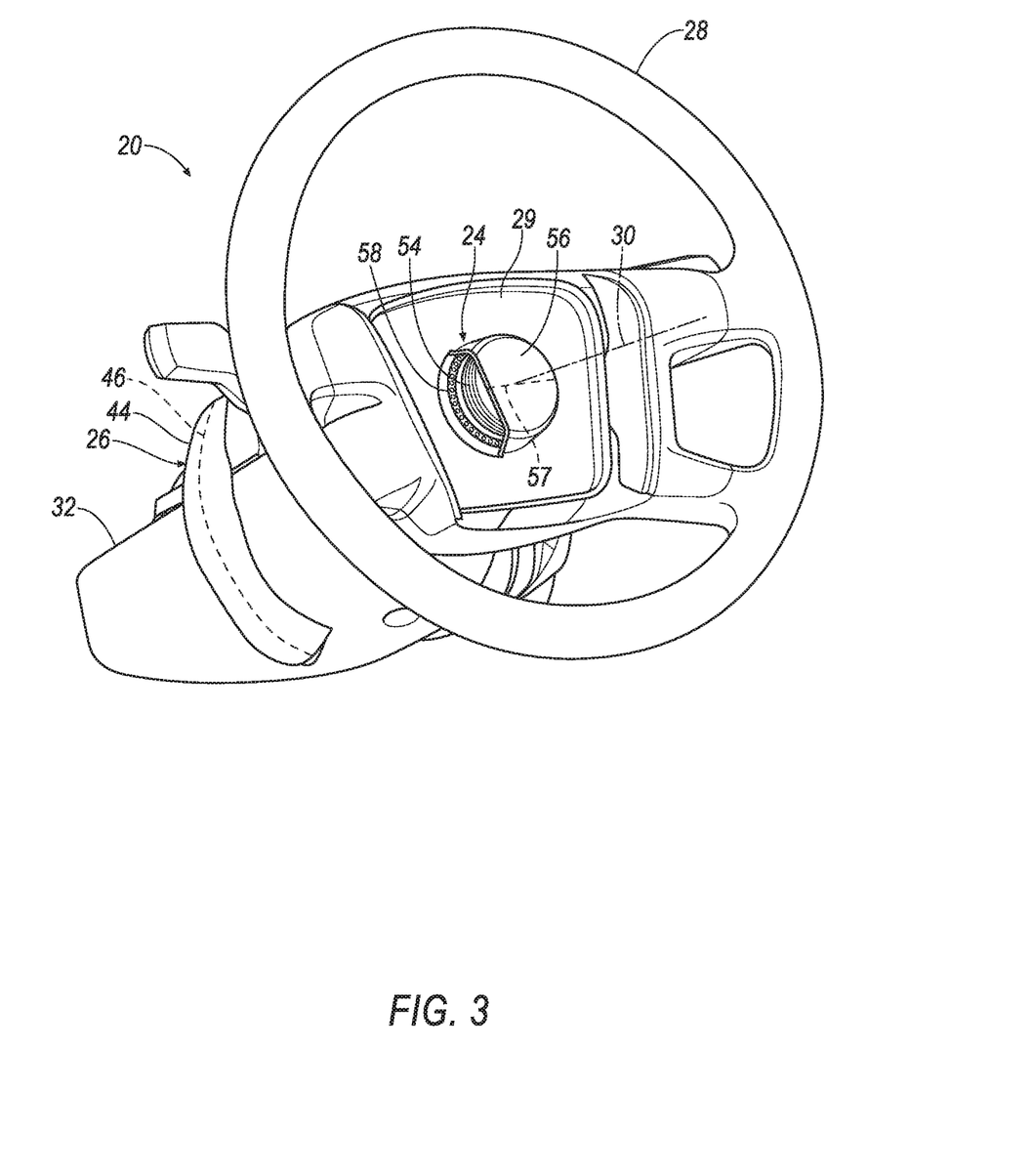
FIG. 3 is a perspective broken-out view of an example support housing and an example steering wheel with the bow tie driver airbag system, as seen in FIG. 2, in an undeployed position.
Figure 4:
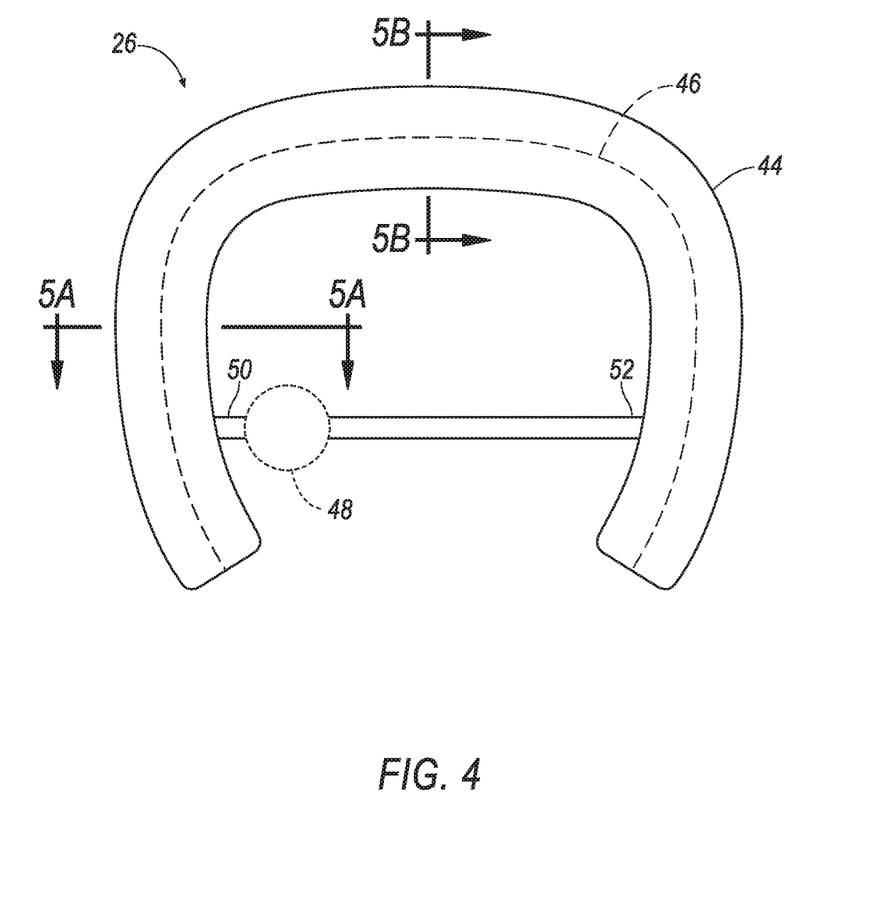
FIG. 4 is a view of a bow airbag assembly of FIG. 2 in an undeployed position.
Figure 5A:
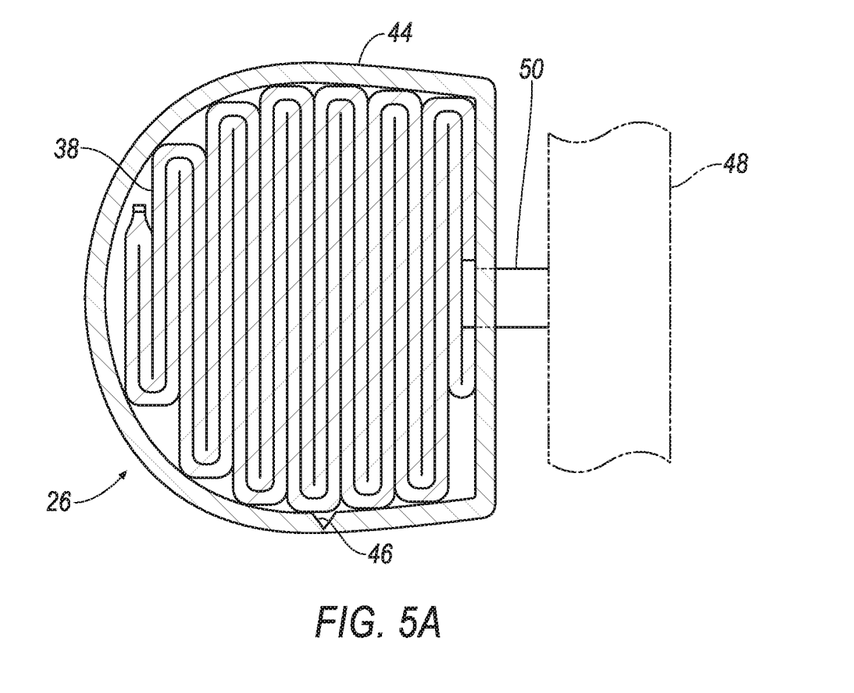
FIG. 5A is a section view of the bow airbag assembly of FIG. 4 in the direction of arrows 5A.
Figure 5B:
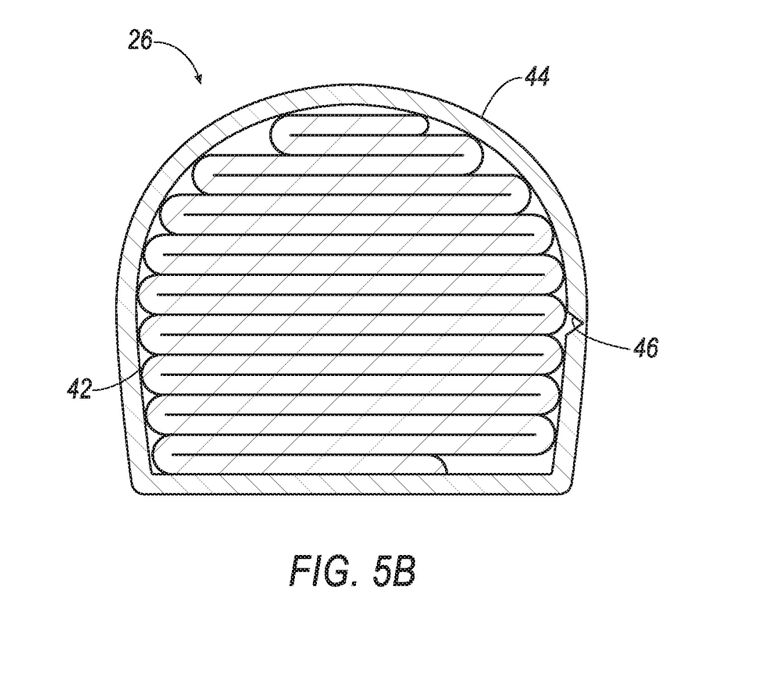
FIG. 5B is a section view of the bow airbag assembly of FIG. 4 in the direction of arrows 5B.

The center airbag assembly 24, best shown in FIG. 3, includes a center airbag 54, illustrated as partially sectioned. The center airbag 54, in an undeployed position, is folded within a center airbag cover 56. The center airbag cover 56 has a center airbag cover tear seam 57 formed across the cover 56. A center airbag actuator 58 of the assembly 24 may be disposed under the airbag 54. The actuator 58 may be actuated by an electrical signal to deploy the center airbag 54 responsive to signals or data from the vehicle sensors as discussed below.

When the center airbag 54 and the left side-wing airbag 38 and the right side-wing airbag 40 are all deployed and in their deployed, i.e., inflated positions, the center airbag resembles a center knot of a bow tie, and the side-wing airbags 38, 40, disposed on either side of the center airbag 54, resemble the bows of the bow tie, the shape lending itself to the name of the bow tie airbag system 20.

Figure 6:
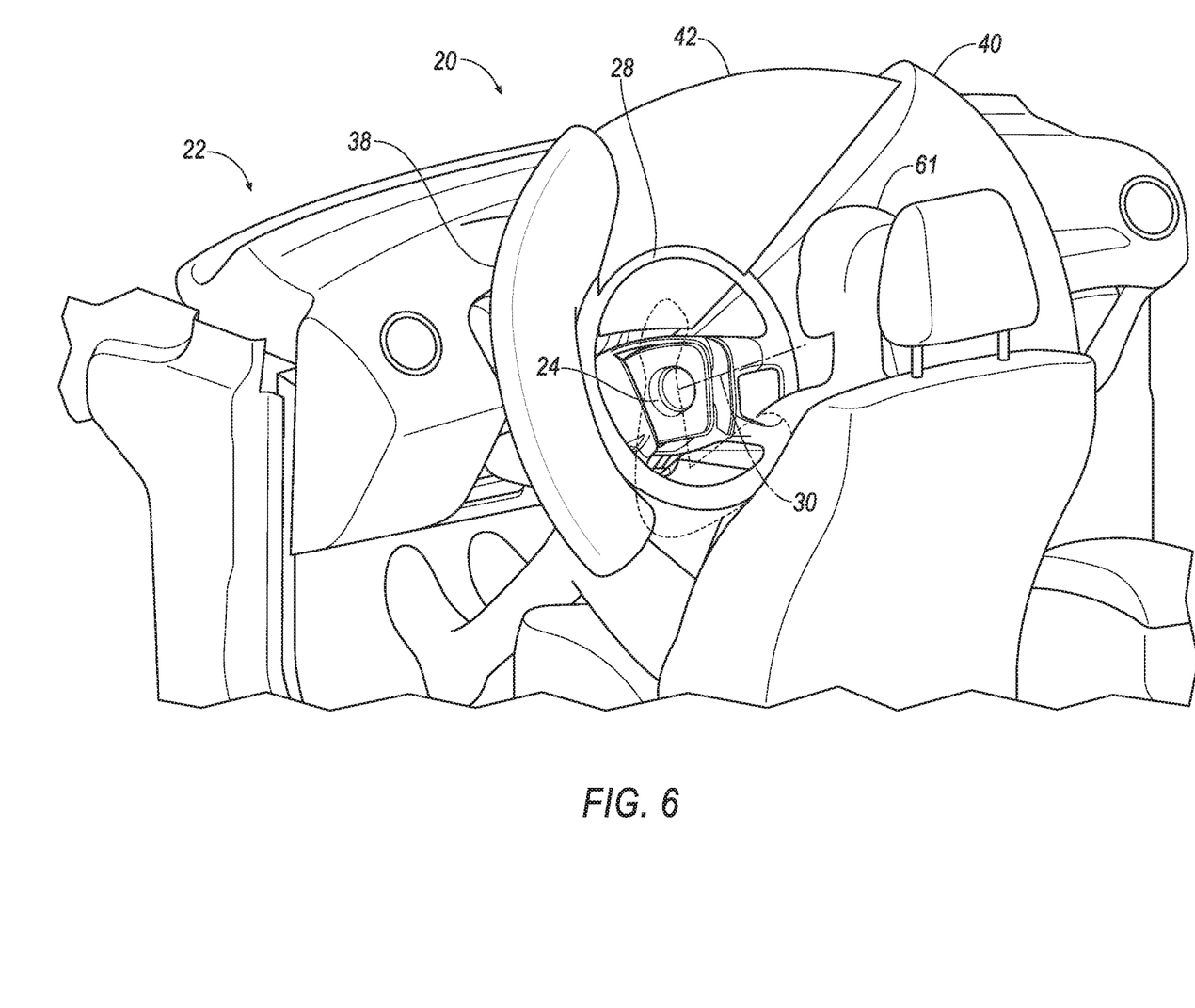
FIG. 6 is a perspective broken-out view of the bow tie driver airbag system of FIGS. 1 and 2 with example lateral wing airbags in a deployed position.
Figure 7:
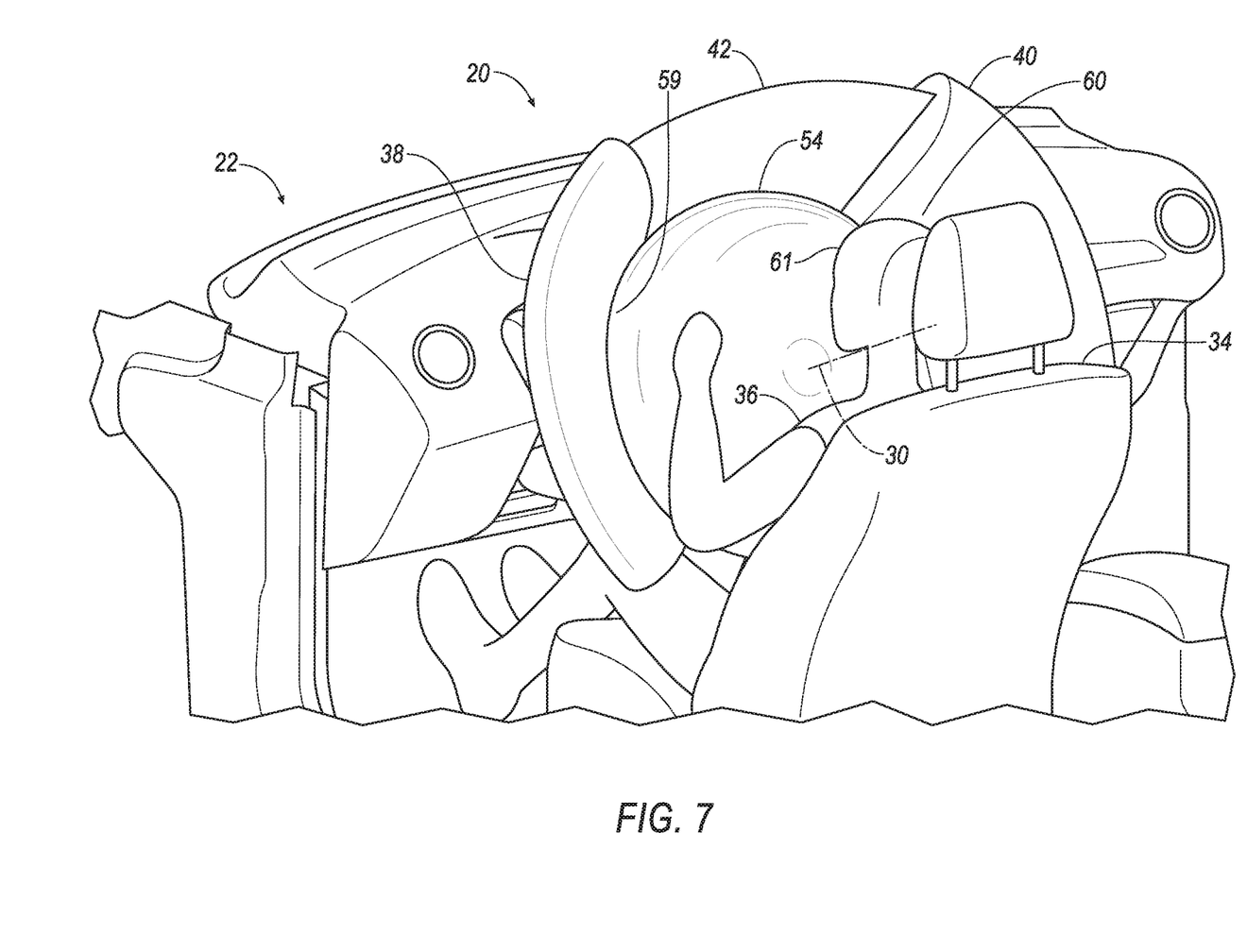
FIG. 7 is a perspective broken-out view of the bow tie driver airbag system of FIGS. 1 and 2 with example lateral wing airbags and a center airbag in a deployed position.
Figure 8:
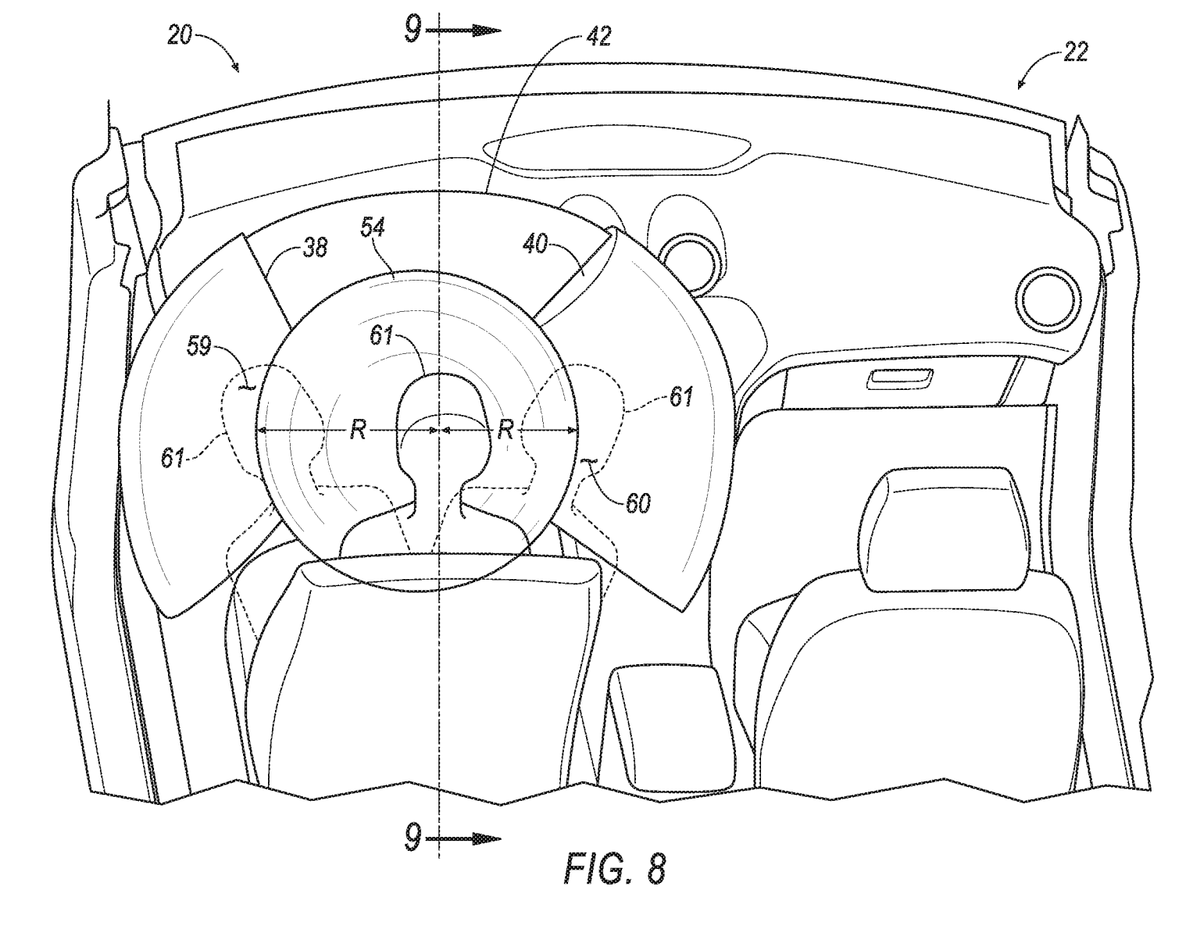
FIG. 8 is a rear view of the bow tie driver airbag system of FIGS. 1 and 2 with example lateral wing airbags and a center airbag in the deployed position.
Figure 9:
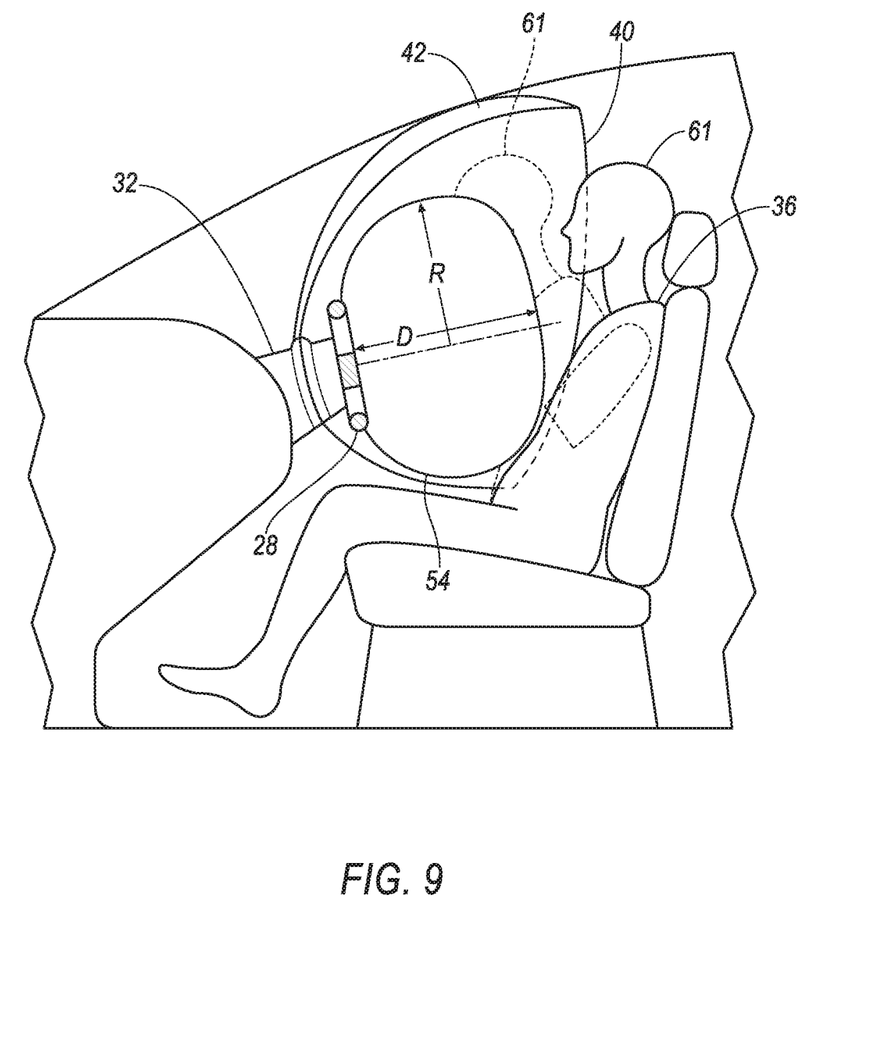
FIG. 9 is a section view in the direction of arrows 9 of FIG. 8.

When deployed, the side-wing airbags 38, 40 extend radially outwardly and rearwardly, rupturing open the cover 44 at the tear seam 46, extending radially away from the support housing 32, and rearwardly away from the instrument panel 31 to a position illustrated in FIGS. 6 through 9. FIG. 6 shows the side-wing airbags 38, 40 deployed and the center airbag 54 not deployed to better illustrate the side-wing airbags 38, 40 in the deployed, i.e., inflated position. It is not expected that deployment of the side-wing airbags 38, 40 will occur without deployment of the center airbag 54. When deployed, the center airbag 54 extends outwardly, rupturing open the center airbag cover 56 at the tear seam 57, extending radially outwardly and rearwardly away from the steering wheel 28 as illustrated in FIGS. 7 through 9.

The side-wing airbags 38, 40 extend radially beyond a radius R of the deployed center airbag 54 and axially along the steering wheel axis 30, beyond a location on a surface of the airbag 54 most distant from the steering wheel 28 defining an axial distance D from the steering wheel 28. A first valley 59 is formed between the center airbag 54 and the left side-wing airbag 38 and a second valley 60 between the center airbag 54 and the right side-wing airbag 40. The valleys 59, 60 serve to trap, i.e., restrain, a head 61 of the driver 36 and prevent it from completely sliding off of the center airbag 54, preventing contact between the head 61 and vehicle structural elements, e.g., a door hinge pillar. The valleys 59, 60 also restrict the amount of rotation of the head 61, and may reduce a magnitude of rotation that might otherwise be experienced by the head 61.

The airbags 38, 40, 54 and the fabric panel 42 may be may be formed of a woven polymer or any other material. As one example, the airbag may be formed of a woven nylon yarn, for example, nylon 6-6. Other suitable examples include polyether ether ketone (PEEK), polyetherketoneketone (PEKK), polyester, etc. The woven polymer may include a coating, such as silicone, neoprene, urethane, and so on. For example, the coating may be polyorgano siloxane.

Figure 1:
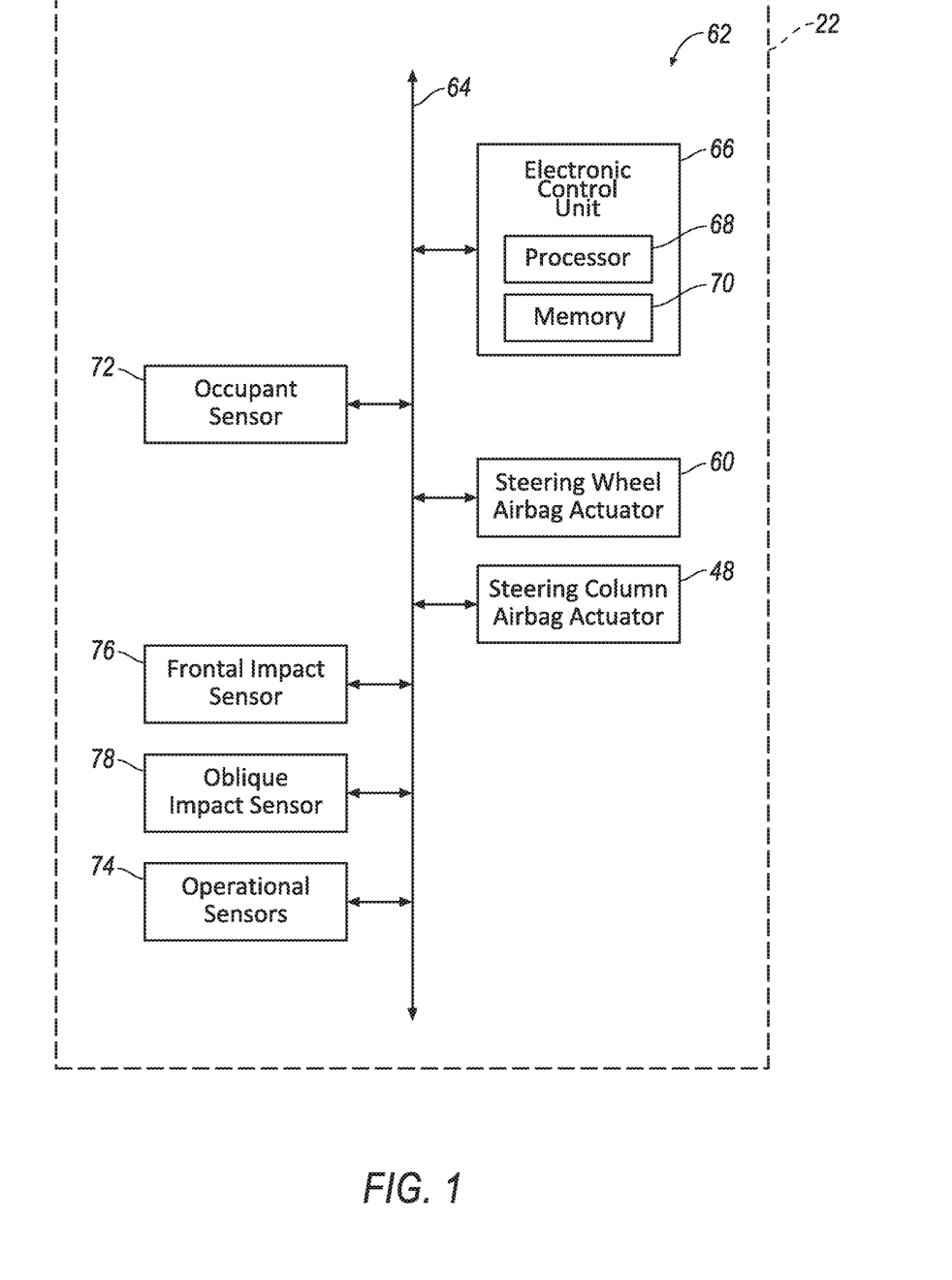
FIG. 1 is a block diagram of an example vehicle incorporating an example bow tie driver airbag system.
Figure 2:
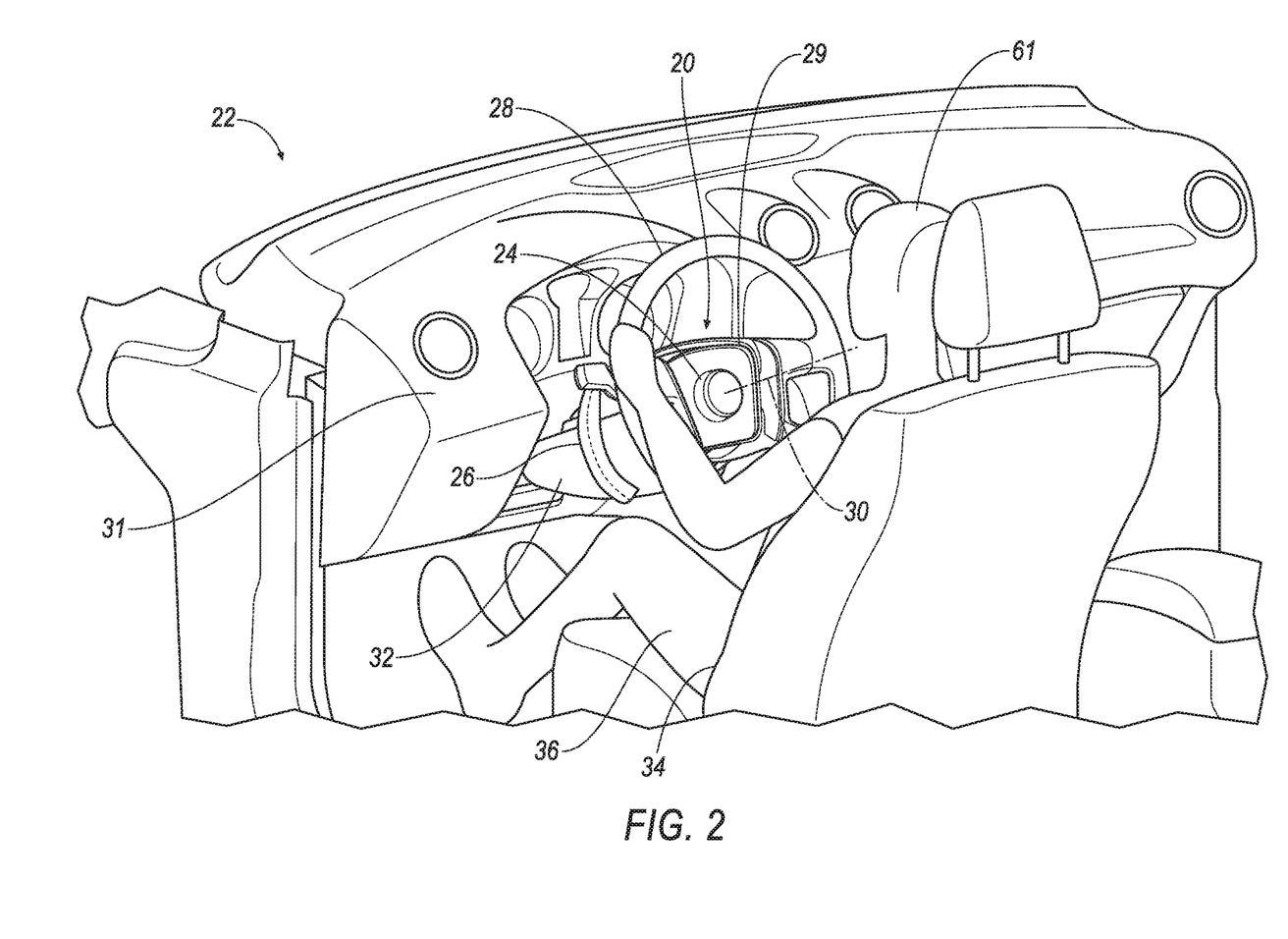
FIG. 2 is a perspective broken-out view of the vehicle of FIG. 1 with the example bow tie driver airbag system in an undeployed position.

A control system 62 for the bowtie airbag system is shown schematically in FIG. 1. The control system 62 may include a vehicle network 64, a computing device, e.g., an electronic control unit ("ECU") 66, and a plurality of sensors.

The vehicle network 64 may include one or more wired and/or wireless communications media such as an example system Control Area Network ("CAN") bus or a Local Interconnect Network ("LIN") and/or other communications media. The network 64 may provide a transmission media between and connect elements of the airbag system 20 including the ECU 66 and components and ancillary systems including, by way of example, the sensors and the air bag actuators 48, 58. Connections to the network 64 of the ECU 66, the sensors and the actuators 48, 58 may be made either by wire or wirelessly, as with Bluetooth® signal transmitting equipment and methods, or with other wireless signal transmission technology.

The ECU 66 may be comprised of a single computing device, as shown in FIG. 1, or may alternatively be comprised of a plurality of computers (e.g., ECUs), including, for example, a powertrain computer, itself potentially comprising an engine computer and a transmission computer, an infotainment computer, a chassis systems computer, a restraint system computer, a vehicle security computer, and so on. The ECU 66 includes an electronic processor 68 and an associated memory 70. The control system 62, including the ECU 66, is programmed to receive signals from the sensors and to execute the exemplary logic of FIG. 10, described in more detail below.

The memory 70 of ECU 66 includes one or more forms of computer readable media, and stores instructions executable by the processor 68 for performing various operations, including such operations as disclosed herein. The processor 68 may read and execute such instructions.

The memory 70 of ECU 66 also stores data. Data may include collected data that is collected from a variety of devices including the sensors described below.

The sensors of the bow tie airbag system 20, of which the control system 62 constitutes part, may include occupant sensors 72, operational sensors 14, and impact sensors 76, 78.

The occupant sensor 72 may be used by the ECU 66 to detect occupancy of the vehicle seat 34 as a condition of deployment of the airbags 38, 40, 54. Example occupant sensors 72 may include weight sensors incorporated into the seat bottom, or infra-red detectors, or motion detectors. The type of occupant sensor 72 selected is not critical. As an alternative to employing a discrete occupant sensor 72, occupancy of a seat may be indirectly or implicitly determined. An example of such indirect occupancy determination for a driver's seat is to require simultaneous actuation of multiple vehicle controls, such as both pressing a brake pedal (not shown) in combination with pressing a start switch on a driver's side of the instrument panel 31. An example implicit determination of seat occupancy is to characterize the seat 34 as occupied when the vehicle 22 is in motion.

The operational sensors 74 provide data signals evidencing that the vehicle 12 is in an operational mode, i.e., a state consistent with operation, i.e., movement. Example operational sensors 74 may include the ignition switch of a car having an internal combustion engine. In a "run" position or condition, the ignition switch is indicative of a readiness of the vehicle to be operated. Another example operational sensor suited for an electrically powered vehicle may be a switch, however managed, used by the occupant of the seat 34 to indicate a readiness to begin operation of the vehicle.

The impact sensor serving as a frontal impact sensor 76 may include an accelerometer oriented to detect an impact as may be determined by an acceleration in a fore-aft direction. The impact sensor serving as an oblique impact sensor 78 may include an accelerometer oriented to detect an acceleration in a lateral, i.e., left-right, direction. An oblique impact, as used herein, is generically inclusive of oblique impacts, i.e., an impact at an angle to a fore-aft axis of the vehicle 22, and offset impacts, i.e., an impact at less than one hundred frontal overlap of the vehicle 22, and any other impacts able to induce any rotatory motion of the vehicle 22. The impact sensors 76, 78 may alternatively be in the form of LIDAR sensors, radar sensors, sonar sensors, etc., allowing an anticipation of an imminent impact. For purposes of this disclosure, sensing both the occurrence of an impact and the sensing of an imminent impact are collectively referred to as sensing an impact.

In the event of the sensing of a frontal impact, as may be indicated by a signal from the frontal impact sensor, the ECU 66, in accord with programming of the ECU 66, may actuate the center airbag actuator 58 to inflate center airbag 54. In event of the frontal impact sensing being accompanied by the sensing of an oblique impact, the oblique impact sensing being indicated by a signal from the oblique impact sensor, as may occur with oblique impacts, the ECU 66, in accord with programming of the ECU 66, may actuate the bow airbag actuator 48, inflating the left side-wing airbag 38 and the right side-wing airbag 40. Operation of the system 20 is described below.

Figure 10:
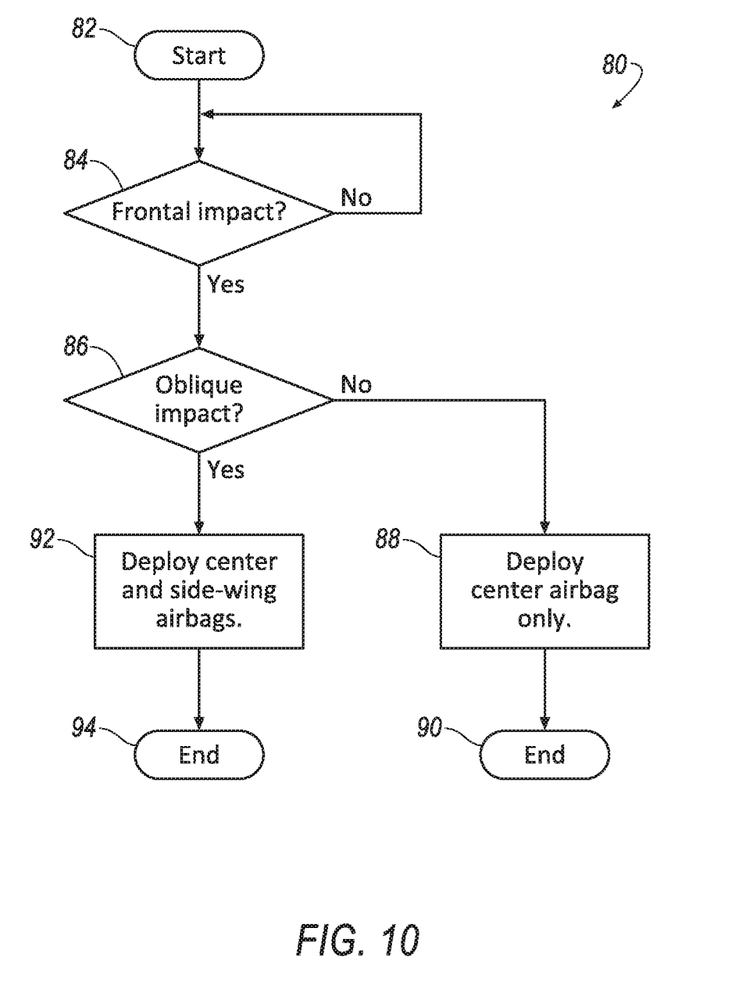
FIG. 10 is an example flow chart of a process to deploy the bow tie driver airbag system.

The ECU 66 may include programming to determine whether to deploy airbags 38, 40, 54 and if so, which configuration to deploy them in. FIG. 10 is a flowchart of an example process 80 incorporated by such programming that may be implemented by one or more components of the system 20. In the exemplary embodiment, the ECU 66 assesses whether there has been an impact based on input from sensors 76 and 78 and further assesses whether the impact is oblique or not, and deploying the airbags 38, 40, 54 appropriately.

A computer program for executing the process 80 may be instantiated in a start block 82, e.g., when a power-on command is issued, as may be associated with the vehicle 22 being powered up responsive to an approach or a touch by a vehicle passenger, and as indicated by the operational sensors 74.

From the start block 82, the process 80 moves to a decision block 84. The decision block 84 determines, based on data from the frontal impact sensor 76, whether a frontal impact has been sensed. When no frontal impact has been sensed, the process 80 may circle back to the decision block 84 to continue checking. When the decision block 84 determines that a frontal impact has been sensed, the process 80 moves on to a decision block 86.

The decision block 86 determines, based on data from the oblique impact sensor 78, whether an off-set impact has been sensed. When it is determined that an off-set impact has not been sensed, the decision block 86 moves on to a process block 88 that causes a signal to be sent by the ECU 66 to the center airbag actuator 58, causing the center airbag 54 to inflate. The process 80 then moves to an end block 90 and terminates. When it is determined that an off-set impact has been sensed, the decision block 86 moves on to a process block 92 which causes a signal to be sent by the ECU 66 to both the center airbag actuator 58 and to the bow airbag actuator 48 which causes each of the left side-wing airbag 38, the right side-wing airbag 40 and the center airbag 54 to inflate. The process 80 then moves to an end block 94 and terminates.

An airbag system 20 and a method for the airbag system 20 have been disclosed.

With regard to the references to computers including controllers in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag system comprising:
   a center airbag disposed in a steering wheel of a vehicle;
   a first side-wing airbag disposed on a first side of a support housing disposed between the steering wheel and an instrument panel of the vehicle;
   a second side-wing airbag disposed on a second side of the support housing;
   a tether connecting the side-wing airbags and disposed above the support housing; and
   a computing device programmed to:
      determine that a frontal impact has been sensed and deploy the center airbag upon determination that the frontal impact has been sensed; and
      determine that an oblique impact has been sensed and deploy the center airbag and the side-wing airbags upon determination that the oblique impact has been sensed.

2. The airbag system of claim 1, wherein the tether is a fabric panel extending in a deployed position from the support housing to an outer radius of the side-wing airbags.

3. The airbag system of claim 2, wherein the fabric panel is non-inflatable.

4. The airbag system of claim 3, wherein the side-wing airbags in a deployed position extend radially beyond the center airbag in the deployed position of the side-wing airbags.

5. The airbag system of claim 1, wherein the side-wing airbags in a deployed position extend axially beyond the center airbag in the deployed position.

6. The airbag system of claim 5, wherein the tether extends beyond the center airbag in the deployed position.

7. The airbag system of claim 1, wherein, when in a deployed position, the side-wing airbags and the center airbag cooperatively define first and second valleys.

8. The airbag system of claim 1, further comprising:
   a first inflator for the center airbag; and
   a second inflator for the side-wing airbags.

9. The airbag system of claim 1, the airbag system further comprising an airbag cover enclosing the side-wing airbags and the tether in an undeployed position.

10. The airbag system of claim 9, wherein the airbag cover is fixed to the support housing.

11. The airbag system of claim 9 wherein the airbag cover has an inverted U-shape.

12. The airbag system of claim 9 wherein the airbag cover is formed of plastic and includes a tear seam.

13. A bow tie airbag system comprising:
   a center airbag assembly including a center airbag disposed in a steering wheel of a vehicle;
   a bow airbag assembly including:
      a first side-wing airbag disposed on a first side of a support housing disposed between the steering wheel and an instrument panel of the vehicle,
      a second side-wing airbag disposed on a second side of the support housing,
      a tether connecting the side-wing airbags and disposed above the support housing, and
      an airbag cover enclosing the side-wing airbags and the tether in an undeployed position; and
   a computing device programmed to:
      determine that a frontal impact has been sensed and deploy the center airbag upon determination that the frontal impact has been sensed; and determine that an oblique impact has been sensed and deploy the center airbag and the side-wing airbags upon determination that the oblique impact has been sensed.

14. The airbag system of claim 13, wherein the airbag cover is fixed to the support housing.

15. The airbag system of claim 13, wherein the airbag cover has an inverted U-shape.

16. The airbag system of claim 13, wherein the airbag cover is formed of plastic and includes a tear seam.

17. The airbag system of claim 13, wherein, when in a deployed position, the side-wing airbags and the center airbag cooperatively define first and second valleys.

18. The airbag system of claim 13, wherein the side-wing airbags in a deployed position extend axially beyond the center airbag in the deployed position.

* * * * *